Nov. 23, 1926.
S. G. GRIFFITHS
1,607,740
CINEMATOGRAPH PROJECTOR FOR ADVERTISING AND OTHER PURPOSES
Filed Sept. 5, 1925
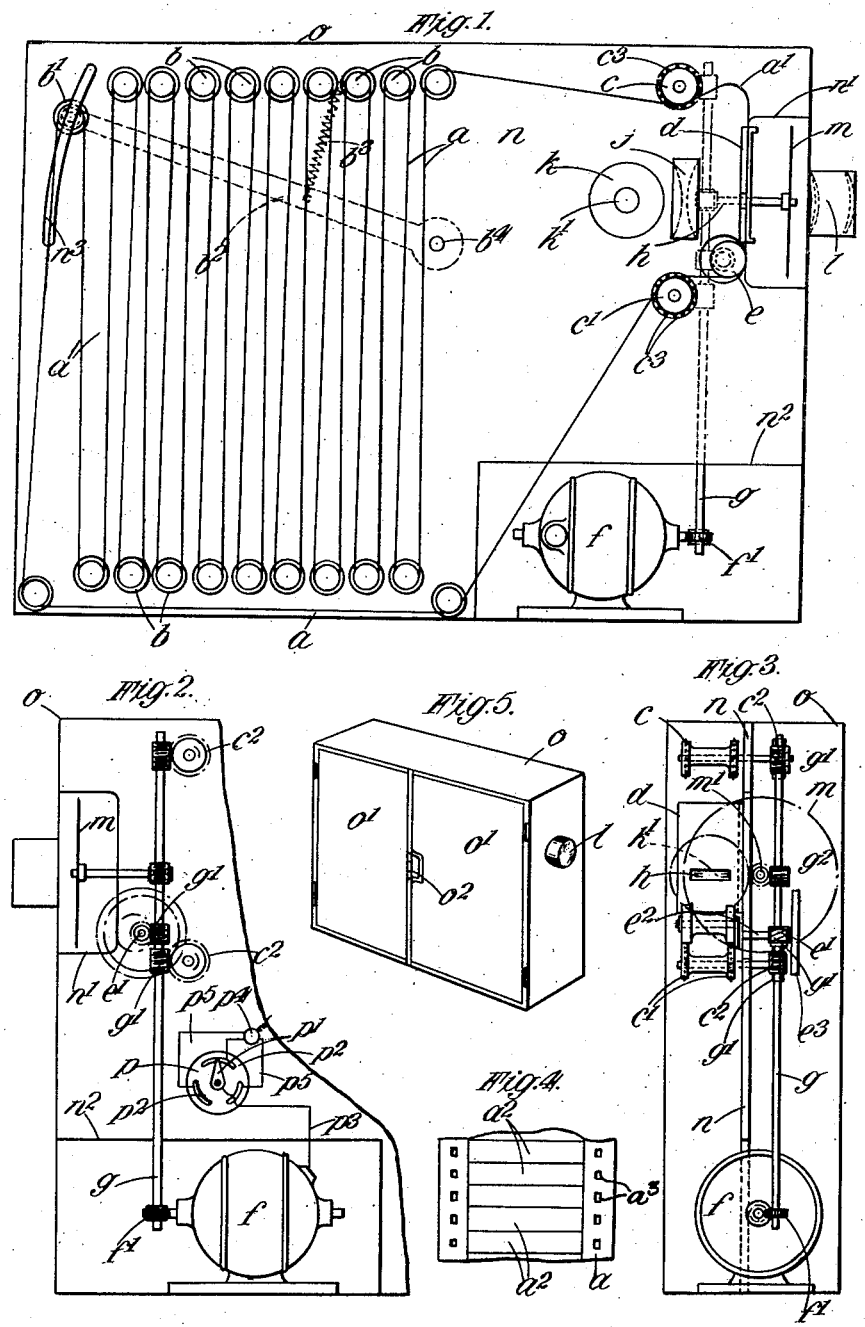

Patented Nov. 23, 1926.

1,607,740

UNITED STATES PATENT OFFICE.

SIDNEY GEORGE GRIFFITHS, OF MARYLEBONE, LONDON, ENGLAND, ASSIGNOR TO UNITED INTERNATIONAL CORPORATION LIMITED, OF LONDON, ENGLAND, A BRITISH COMPANY.

CINEMATOGRAPH PROJECTOR FOR ADVERTISING AND OTHER PURPOSES.

Application filed September 5, 1925, Serial No. 54,650, and in Great Britain September 13, 1924.

This invention has reference to cinematograph projectors capable of being used for advertising, amusement, educational and other purposes, the projectors being of the kind comprising gearing capable of being operated by hand or a power motor for intermittently moving a film through a gate disposed between a suitable source of light and a projecting lens, the exposure of the successive picture or equivalent sections of the film being regulated by the usual rotary form of shutter arranged between the film and the projecting lens.

In known forms of projectors capable of being used with lengths or endless bands of film, each picture or equivalent section is approximately square in shape having each side of about the same length, while a plurality of sprocket teeth openings, generally four, are formed in the opposite margins of the film for each of the said sections. Further, with picture or equivalent sections of this character there is considerable difficulty in obtaining equal illumination over the entire surface, each such section being illuminated to a greater intensity at the centre portion that at the side margins.

According to this invention a comparatively long and narrow and evenly illuminated picture or its equivalent is capable of being exhibited on a suitable screen through the medium of a film provided with long narrow picture or equivalent sections of such a size as to permit a plurality of individual sections occupying the same area as that occupied by a section as at present known and a projector comprising a long narrow aperture corresponding with the long narrow sections on the said film, a source of light extending lengthwise of the said aperture and gearing for intermittently moving the film step by step relatively to the aperture. Preferably each of the long narrow picture or equivalent sections extends across the film from and to the margins on each side and four of such long narrow sections occupy the space usually taken up by one of the usual square sections on films as at present used. Where this arrangement is provided one sprocket tooth opening is provided at each end of each long narrow picture or equivalent section and the intermittent movement of the film is obtained through the medium of gearing capable of imparting a step by step movement equal in length to the pitch or distance between adjacent teeth. Such gearing may comprise ratchet and pawl, cam and pin, eccentric, worm or worm wheel or equivalent mechanism. In an alternative arrangement, the long narrow picture or equivalent sections may extend lengthwise of the film instead of transversely with two of the long narrow sections adjoining the margins of the film and two intermediate thereof. Where the alternative arrangement is provided in connection with films the projector comprises means for transversely reciprocating the portion of the film passing through the gate for alternately moving the long narrow sections into alignment with the exposure aperture, the lengthwise movement of the film being effected at the finish of the exposure of each succeeding set of four long narrow sections. The means for moving the film transversely step by step may consist of frames capable of carrying the sprocket wheels and adapted to be moved lengthwise of spindles on which they are mounted, the step by step movement of the frames being obtained by a series of arms on each of the frames and two series of four oppositely disposed angular projections on two rotary hubs capable of being moved through a complete revolution for each reciprocation of the film, each series of projections being disposed on opposite sides of the hubs. With this arrangement each projection serves to move the film one quarter of the width of the portion between the margins while the film is moved lengthwise a distance equal to four sprocket teeth openings at the end of the exposure of four long narrow sections. The projector is preferably provided with a series of rollers on which the endless band of film is arranged one of such rollers being carried on a spring or weight controlled arm for holding the film band taut, while the gearing is preferably driven through the medium of an electric motor, the supports for the film band, the motor and other parts of the projector being suitably arranged in a case capable of enclosing the same and serving as a means for holding and transporting the same and constituting a self contained apparatus capable of being produced at a comparatively low cost. From the foregoing it will be apparent that the projector apparatus is of special use for advertising purposes and is capable of being disposed on a suitable support for the projection of advertisements and other matter on to a shop window, shop blind, boarding or the equivalent thereof suitable for the purpose. One or both sides of the case is or are constituted of doors capable of being opened to afford ready access to the whole of the interior and facilitate the introduction and removal of endless films, the latter being produced by photographic, lithographic or other forms of printing. If desired, the projector apparatus may be provided with a clock driven switch or the equivalent thereof to enable the same to be brought into and put out of use automatically for predetermined periods of time. Such switch may also be capable of operation by hand for controlling the operation and use of the projector apparatus.

In order that the said invention may be clearly understood and readily carried into effect, the same will now be fully described by way of example with reference to the accompanying drawings, in which:—

Figure 1 is a side elevation of one side of a cinematograph projector constructed according to this invention, the side of the case being removed to clearly illustrate the mechanism on this side of the projector.

Figure 2 is a similar view to Figure 1 of part of the opposite side of the projector.

Figure 3 is a front view of the projector shewn in Figures 1 and 2 with the case broken away.

Figure 4 illustrates a portion of a film capable of being used with the projector shewn in Figures 1, 2 and 3.

Figure 5 is a perspective view to a reduced scale illustrating the projector as a whole.

The continuous film $a$ is arranged on a series of supports or rollers $b$ and is capable of being moved lengthwise through the medium of the feed sprocket wheel $c$ which serves to advance the film towards the film gate $d$ and thereby provide a looped portion $a^1$ which is taken up by the take-up sprocket wheel $c^1$ following the intermittent rapid movement of the portion of the film in the film gate $d$ effected by the eccentric $e$, the rotation of the sprocket wheels $c$ and $c^1$ and of the eccentric $e$ being obtained through the medium of an electric motor $f$ and worm and worm wheel gear $f^1$ serving to drive a shaft $g$ provided with worms $g^1$ for imparting motion to the worm wheels $c^2$ and $e^1$. The film gate $d$ is provided with the long narrow exposure aperture $h$ which is disposed between the film $a$ and an optical condenser $j$ arranged intermediate of the said aperture $h$ and an electric lamp $k$. The latter is so disposed relatively to the aperture $h$ that the lamp filament $k^1$ extends lengthwise thereof, being thus arranged to evenly illuminate the whole of the portion of the film $a$, that is one picture or equivalent section $a^2$, disposed opposite the aperture $h$ for enabling the same to be projected on to a screen (not shewn) with an equal illumination over the whole of the area of the projected picture or its equivalent. The projection of the latter is effected in the usual manner by an objective $l$ between which and the film $a$ is disposed the known form of rotary shutter $m$ driven from the aforesaid shaft $g$ through the medium of the worm $g^2$ and worm wheel $m^1$. The spindle $e^2$ about which the eccentric $e$ is rotated is fitted with a flywheel $e^3$ for obtaining a smooth and regular operation of the eccentric. The whole of the mechanism is mounted on a plate $n$ with cut out portions $n^1$ and $n^2$ respectively serving for the accommodation of the rotary shutter $m$ and the motor $f$ and with a curved slot $n^3$ for permitting movement of the roller $b^1$ whereby the film is maintained in a taut condition the roller $b^1$ to this end being carried on an arm $b^2$ controlled by a spring $b^3$ and pivotally mounted at $b^4$ on the said plate $n$. The film $a$ is provided with the long narrow picture or equivalent sections $a^2$ as shewn in Figure 4, approximately equal in depth to one fourth of the usual section, and opposite the ends of each such long narrow sections are formed the sprocket teeth openings $a^3$ for engagement with the teeth $c^3$ of the sprocket wheels $c$ and $c^1$ each of which is preferably provided with sixteen teeth and are rotated one sixteenth of a revolution for each picture or equivalent section exhibited. The complete film band $a$ is arranged on the rollers $b$ and $b^1$ and the sprocket wheels $c$ and $c^1$ and eccentric $e$ with a portion in the film gate $d$ as shewn in Figure 1 through the medium of a case $o$ as shewn in Figure 5, which is provided with doors $o^1$ forming the complete side of the case to facilitate the introduction and mounting of the film band $a$ the doors $o^1$ being fitted with a suitable fastener $o^2$. The case also serves to enclose the whole of the film band and mechanism and affords a convenient means for transporting the cinematograph projector as a whole. To provide for the intermittent or automatic operation of the projector, the plate $n$ is fitted with a clockwork or similar mechanism $p$ having make and break contact devices $p^1$ and $p^2$ the device $p^1$ being rotated by the mechanism and connected with the electric motor $f$ by the electric lead $p^3$ and the contact plate devices $p^2$ being electrically connected with a suitable electric plug or switch $p^4$ by the separate leads $p^5$.

What I claim and desire to secure by Letters Patent of the United States is:—

1. In the projection of cinematograph pictures, the combination with a film provided with marginal sprocket-wheel-teeth apertures, and with pictures areas, each of the latter of which extends horizontally the normal picture width of the film from the apertures on one side to those on the opposite side and vertically a fraction of such width, of a cinematograph projector comprising means for moving the film lengthwise, a stationary projecting lens of a diameter greater than the width of the picture areas, a stationary film gate with an exposure aperture approximately corresponding in size to that of each picture area of the film, and means for successively illuminating the picture areas.

2. In the projection of cinematograph pictures, the combination with a film provided with marginal sprocket-wheel-teeth apertures, and with picture areas, each of the latter of which extends horizontally the normal picture width of the film from the apertures on one side to those on the opposite side and vertically a fraction of such width, of a cinematograph projector comprising means for moving the film lengthwise, a stationary projecting lens of a diameter greater than the width of the picture areas, a stationary film gate with an exposure aperture approximately corresponding in size to that of each picture area and of the film, and an electric lamp with a horizontally disposed filament extending lengthwise of the exposure aperture for evenly illuminating in successive order the whole of each picture area.

3. In the projection of cinematograph pictures, the combination with a film provided with marginal sprocket-wheel-teeth apertures and with picture areas each of the latter of which extends horizontally the normal picture width of the film from the apertures on one side to those on the opposite side and vertically a fraction of such width, of a cinematograph projector comprising a series of rollers for supporting an endless film, means for holding the endless film taut on the rollers, worm and worm wheel gearing including a cam mechanism for imparting intermittent longitudinal movement to the film, a rotatable shutter in engagement with the gearing, a stationary projecting lens of a diameter greater than the width of each of the picture areas, a stationary film gate provided with an exposure aperture approximately corresponding in size to that of each picture area of the film, and an electric light with a horizontally disposed filament extending lengthwise of the said aperture.

4. In the projection of cinematograph pictures, the combination with a film provided with marginal sprocket-wheel-teeth apertures and with picture areas each of the latter of which extends horizontally the normal picture width of the film from the apertures on one side to those on the opposite side and vertically a fraction of such width, of a cinematograph projector comprising a series of rollers for supporting an endless film, a supporting plate for the rollers arranged on one side thereof, a spring controlled lever disposed on the opposite side of the plate to that of the rollers and connected with one of the rollers through a slot in the plate, feed rollers and take-up cam mechanism for the film mounted on the same side of the plate as the supporting rollers, a rotatable shutter, worm and worm wheel gearing on the opposite side of the plate to that of the supporting rollers for imparting motion to the feed rollers as well as the take-up cam mechanism and shutter, a stationary projecting lens of a diameter greater than the width of each of the picture areas, a stationary film gate mounted on the said plate and provided with an exposure aperture approximately equal in size to that of each picture area of the film, an electric light with a horizontally disposed filament extending lengthwise of the said aperture, and a casing in which is mounted the said plate which separates the casing into two compartments, the sides of the casing being constituted by doors occupying approximately the entire area thereof.

5. In the projection of cinematograph pictures as in claim 1, a film provided with marginal sprocket-wheel-teeth apertures and with adjoining picture areas, each of the latter of which are adapted for normal projection and extend horizontally from near the marginal apertures on one side of the film to near those on the opposite side and also extend vertically a distance which is a fraction of the width thereof.

6. In the projection of cinematograph pictures as in claim 1, a cinematograph projector comprising a fixed projecting lens, and a stationary film gate with an exposure aperture of greater width than height and of less width than the diameter of the lens.

7. In the projection of cinematograph pictures as in claim 1, a cinematograph projector comprising a stationary film gate with an exposure aperture of much greater width than height, a projecting lens of larger diameter than the width of the exposure aperture and disposed with its axial centre coincident with the centre of the aperture and an electric lamp provided with a horizontally disposed filament extending lengthwise of the aperture.

SIDNEY GEORGE GRIFFITHS.